United States Patent [19]

Shamie

[11] Patent Number: 4,527,665
[45] Date of Patent: Jul. 9, 1985

[54] PERAMBULATOR BRAKE

[76] Inventor: Louis Shamie, 630 Avenue V, Brooklyn, N.Y. 11223

[21] Appl. No.: 465,259

[22] Filed: Feb. 9, 1983

[51] Int. Cl.³ .......................... B62B 9/08; B62B 11/00
[52] U.S. Cl. ..................................... 188/20; 280/650; 280/47.41
[58] Field of Search ..................................... 188/19–22, 188/60, 69, 31; 74/527; 280/644, 650, 47.41; 292/277, 207, 106, 7

[56] References Cited

U.S. PATENT DOCUMENTS

| | | | |
|---|---|---|---|
| 352,689 | 11/1886 | Haus | 188/20 |
| 482,708 | 9/1892 | Watkins | 188/20 |
| 2,784,963 | 3/1957 | Whalen | 280/47.41 |
| 3,918,750 | 12/1973 | Okamoto | 292/106 |
| 4,077,640 | 3/1978 | Perego | 280/650 |

FOREIGN PATENT DOCUMENTS

| | | | |
|---|---|---|---|
| 13721 | 5/1881 | Fed. Rep. of Germany | 188/20 |
| 226954 | 1/1925 | United Kingdom | 280/41 |

Primary Examiner—Bruce H. Stoner, Jr.
Assistant Examiner—Alvin Oberley
Attorney, Agent, or Firm—McGlew and Tuttle

[57] ABSTRACT

A braking device for a perambulator having a frame and a wheel with at least one recess comprises a disc rotatably mounted to the frame with a brake rod pivotally mounted to the disc and movable with rotation of the disc from a locking position engaging the wheel recess to an unlocking position away from the wheel recess. The disc includes a slot with at least one enlargement through which extends a rod-like actuator having stepped portions. With the disc rods in their locking position, a large diameter portion of the actuator is disposed in the enlargement of the slot to prevent inadvertent rotation of the disc. To unlock the perambulator wheel, the actuator must first be depressed to clear its large diameter portion from the slot enlargement and thereafter the disc can be rotated. The braking device also includes a resilient suspension for the rear wheels formed by plates to which the braking device and an axle for the rear wheels are fixed and which form guides for the brake rods. Springs connect the plates to the perambulator frame to establish a resilient suspension for the rear wheels.

14 Claims, 4 Drawing Figures

U.S. Patent  Jul. 9, 1985  4,527,665

PERAMBULATOR BRAKE

FIELD AND BACKGROUND OF THE INVENTION

The present invention relates in general to baby carriages and in particular to a new and useful device for braking the movement of a parambulator and improving suspension thereof.

Parambulators are known which include brakes for preventing rotation of the rear wheels. These brakes are usually in the form of clamping channels which are pressed down over the tire of one or more parambulator wheels to prevent the rotation thereof. To disengage the brake the channels are pivoted away from the wheels in a single operation per wheel. Since only a single operation is necessary, the brake can easily become dislodged accidentally, which would be a particularly hazardous condition especially an infant is sitting in the perambulator.

For this reason it is desirable to provide some form of multiple action system which requires more than a single operation to disengage a perambulator brake. At the same time such a system must be easily operable by a person pushing the perambulator, and preferably with the person remaining in an upright position while engaging or disengaging the braking system.

SUMMARY OF THE INVENTION

The present invention is drawn to a braking device for a perambulator which utilizes a double action mechanism for disengaging a brake from one or both rear wheels of a perambulator. The braking device is operable using the foot for both engaging and disengaging the brake.

Accordingly, an object of the present invention is to provide a braking device for a perabulator having a frame and a wheel with at least one recess rotatably mounted to the frame, comprising stopping means movably mounted to the frame and having a stop portion movable from an unlocking position away from the wheel to a locking position in the recess of the wheel for blocking rotation of the wheel, guide means connected to the frame adjacent the wheel for guiding the stop portion between its locking and unlocking positions and blocking means connected to the frame for locking the stopping means in the locking position of the stop portion, the locking means having a portion movable in at least one direction to unlock the stopping means with the stop portion movable in a different direction between its locking and unlocking positions.

A further object of the invention is to provide such a braking device wherein the stopping means comprises a disc rotatably mounted to the frame with a brake rod forming the stopping portion pivotally mounted to the disc at an eccentric location thereon.

A still further object of the invention is to provide such a braking device wherein the locking means comprises an actuator pin movably mounted to the frame, the disc having an arcuate slot therein through which the pin extends, the arcuate slot having an enlarged portion and the actuator pin having an enlarged stepped portion movable into the enlarged portion of the slot for locking the disc and brake rod in the locking position.

Another object of the invention is to provide such a braking device wherein the stopping and locking means are connected to an axle for rotatably receiving the wheel, the perambulator having a pair of rear legs, a plate pivotally connected to each rear leg and fixedly connected to said axle with biasing means connected between the frame and the plates for resiliently suspending the wheel.

A still other object of the invention is to provide a braking device for a perambulator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
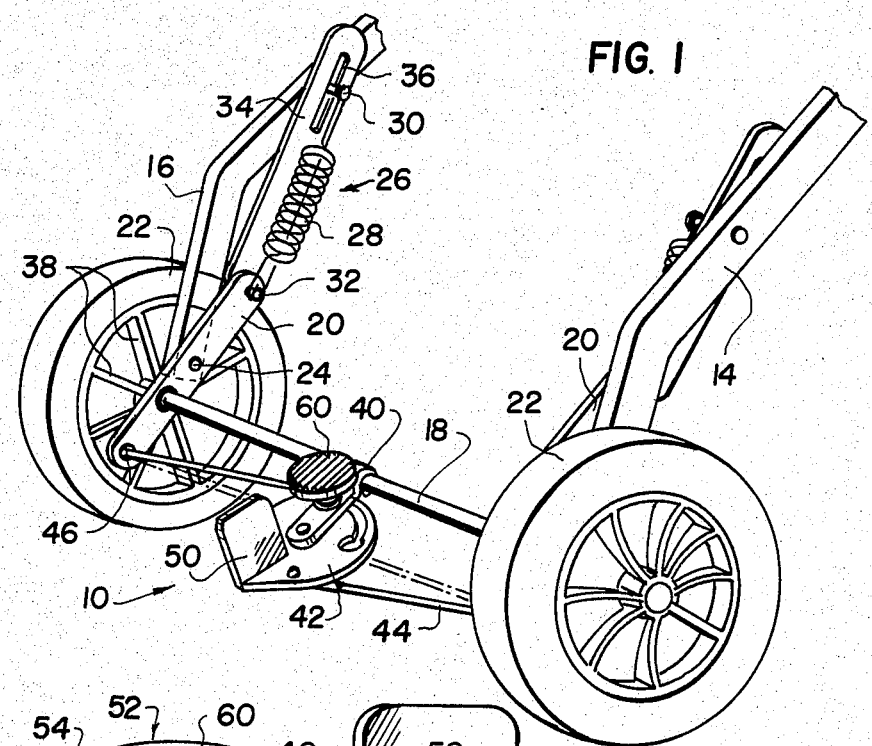
FIG. 1 is a rear perspective view of the braking device according to the invention showing a rear portion of the perambulator frame and two rear perambulator wheels, the braking device being in its unlocking position.
Figure 2:
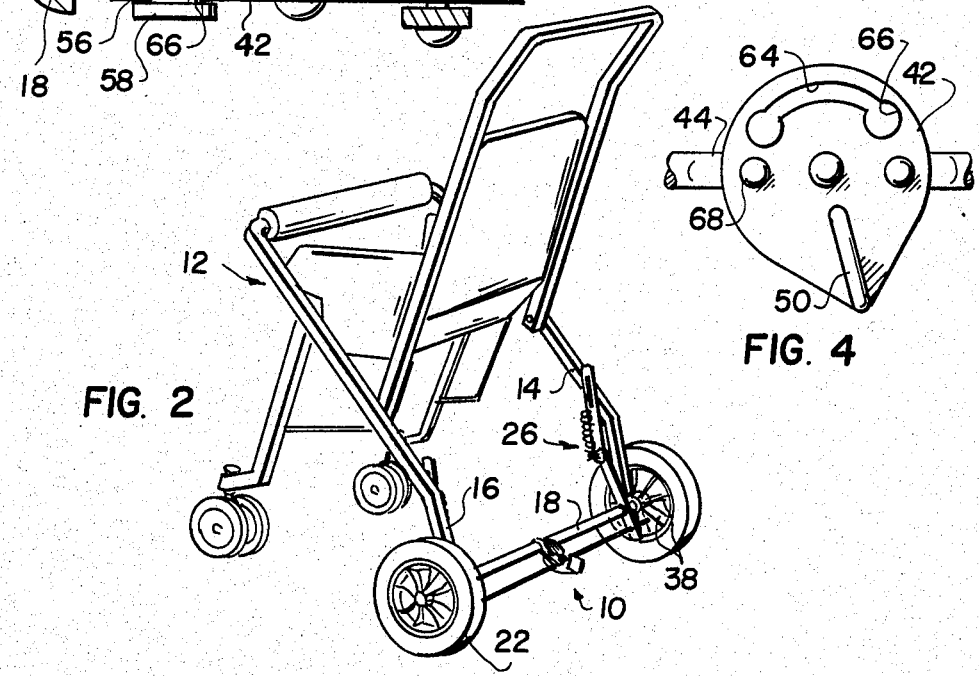
FIG. 2 is a rear perspective view of a perambulator with the braking device of the invention shown in its locking position.

Referring to the drawings in particular, the invention embodied therein in FIGS. 1 and 2 comprise a braking device generally designated 10 for a baby carriage or stroller generally designated 12 having a frame with two rear legs 14 and 16. A rear axle 18 is fixed to a pair of plates 20 by welding and extends beyond plates 20 to rotatably receive a pair of rear wheels 22.

Plates 20 are pivtally mounted to the ends of legs 14, 16 at pivot joints 24. Biasing means generally designated 26 are connected between plates 20 and the perambulator frame for establishing resilient suspension of the rear wheels 22. Biasing means 26 on either side of perambulator 12 comprises a spring 28 connected between posts 30 and 32. Post 32 also forms a pivotal connection between each plate 20, which forms suspension plates, and a limiting plate 34. Limiting plate 34 includes an elongated slot 36 through which post 30 extends. This limits the extent to which spring 28 can be stretched on either side of the perambulator to avoid overstressing the spring. A plastic sleeve (not shown) can also be provided over spring 28 to prevent unnecessary wear and also as a safety factor against undesired contact between a user or his clothing and the spring 28.

It is noted that biasing means 26 act as a spring and shock absorber for the perambulator frame since axle 18 is positioned outboard of pivot joints 24. As will be described in greater detail hereinunder, this same biasing arrangement establishes a resilient braking of the rear wheels 22.

Rear wheels 22 each include a plurality of recesses formed by spokes or ribs 38.

Figure 3:
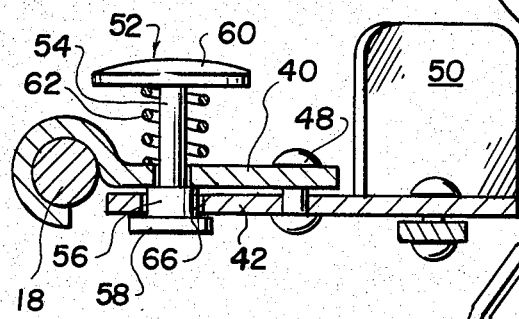
FIG. 3 is an enlarged sectional view partially in elevation showing the bell crank and locking portion of the braking device in its locked position.
Figure 4:
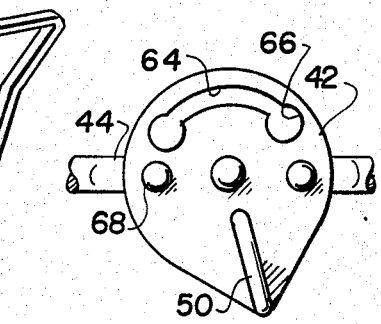
FIG. 4 is a top plan view of a disc forming a part of the braking device with connected brake rods.

The braking device 10 as shown in FIGS. 1, 3 and 4, comprises a journal plate 40 fixed to axle 18 by welding or other means. Stopping means in the form of a disc 42 and brake rods 44 are connected to plate 40 and guided by suspension plates 20 which have apertures 46 for receiving the ends of rods 44. Disc 42 is rotatably mounted on journal plate 40 at a pivot joint 48. For economy of manufacturing, all pivot joints may be formed of rivets or posts.

Disc 42 can be rotated by a user's foot which can engage either side of a panel 50 fixed to disc 42. Panel 50 as disc 42 can be made of sheet metal and may be provided with a rubber boot thereover for safety and to increase frictional contact between a user's shoe and the panel.

With disc 42 rotated into its unlocking position as shown in FIG. 1, rods 44 just enter apertures 46 of plates 20 but do not engage the recesses of wheels 22 formed by ribs 38. Disc 42 can be rotated into its locking position shown in FIGS. 2, 3 and 4. In this position rods 44 extend into recesses of wheels 22 to block the rotation thereof.

While movement of disc 42 in a single direction will move the stopping means into its respective locking and unlocking positions, this movement, at least in the direction from the locking to the unlocking position, is prevented by a locking means actuator 52 which is best shown in FIG. 3. Actuator 52 includes a small diameter portion 54, a large diameter portion 56 and a head 58. Actuator 52 also includes a button 60 which is engageable by the user's foot to depress the actuator downwardly. Actuator 52 is axially movable in an aperture provided in journal plate 40, with its upward movement as shown in FIG. 3 stopped by the engagement of large diameter portion 56 against the bottom of plate 40. Actuator 54 is biased upwardly by a spring 62.

As shown in FIG. 4, disc 42 includes an arcuate slot 64 having a pair of enlargements 66. The diameter of enlargements 66 is slightly larger than that of large diameter portion 56 but smaller than head 58. The width of slot 64 is slightly larger than the diameter of small diameter portion 54 but smaller than that of large diameter portion 56. With large diameter portion 56 as shown in FIG. 3 disposed in enlargement 66, disc 42 cannot be rotated. To rotate disc 42, an operator must first depress actuator 52 by pressing button 60 downwardly against the bias of spring 62 and then, using the same foot, rotate disc 42 by sideways movement of panel 50. This activity constitutes a double action movement to unlock the braking device. The braking device thus cannot be unlocked accidentally since a purposeful combination of different movements are necessary. While two enlargements 66 are shown on slot 64 in FIG. 4, only a single enlargement is necessary since a double action requirement is not essential for movement of the locking device from its unlocking position to its locking position. Two enlargements are used however for maximum safety to prevent inadvertent disengagement or engagement of the braking device.

Brake rods 44 are pivotally mounted at joints 68 (which again may be rivets) to disc 42. A dot-dash line in FIG. 1 shows the position of rods 44 when blocking the rotation of wheels 22.

Button 60 of actuator 52 may have a rubber top which is serrated as shown in FIG. 1 for maximum frictional contact between the user's shoe and the actuator. This is particular important since the top of button 60 is also used as a pivot point for rotation of the shoe when used to rotate disc 42. Panel 50 is advantageously positioned as shown in FIG. 2 so that with the disc in its locking or unlocking position, a best possible position is established for engagement by the user's shoe.

With rods 44 in the recesses of wheels 22, biasing means 26 also act as shock absorbers for the braking device. Forward motion of perambulator 12 for example, will cause clockwise rotation of wheels 22. One of the ribs 38 will then engage each rod 44. Slight further rotation of wheels 22 can then take place with a corresponding pivoting of plates 20 against the bias of springs 28. This further pivoting is eventually stopped however, either by spring 28 itself or the limiting plate 34 as pins 30 engage the top of slots 36. The braking of perambulator 12 is thus established in a resilient rather than fixed manner to avoid undesirable shocks, in particular to an infact sitting in the perambulator.

While a specific embodiment of the invention has been shown and described in detail to illustrate the application of the principles of the invention, it will be understood that the invention may be embodied otherwise without departing from such principles.

What is claimed is:

1. A braking device for a perambulator having a frame and a wheel with at least one recess therein, the wheel being rotatably mounted to the frame, comprising:

an axle for rotatably mounting the wheel;

stopping means movably mounted on the frame and carried on said axle, said stopping means having a brake rod movable from a locking position in the wheel recess for blocking rotation of the wheel, to an unlocking position out of the wheel recess for permitting rotation of the wheel;

a suspension plate connected to the frame for rotation about a pivot joint and disposed adjacent the wheel, said suspension plate having an aperture therethrough spaced from said pivot joint for guiding said brake rod for movement between its locking and unlocking positions, said axle being fixed to said guide plate at a location spaced from pivot joint and from said aperture;

first biasing means connected between said suspension plate and the frame for resiliently suspending said axle and the wheel on the frame; and locking means connected to said axle for locking said stopping means in at least the locking position of said brake rod, said locking means having an actuator movable in at least one direction for unlocking said stopping means, said brake rod movable in a different direction for movement from its locking into its unlocking position, whereby to move said brake rod into its locking position said actuator must first be moved in one direction and then said brake rod must be moved in a different direction and, with said brake rod in its locking position, the wheel is resiliently held from rotation with respect to the frame over said first biasing means.

2. A braking device according to claim 1, wherein said stopping means comprises a disc rotatably mounted to said axle, said brake rod pivotally mounted to said disc at an eccentric location thereon, said brake rod being movable into its locking position in the wheel recess with rotation of said disc.

3. A braking device according to claim 2, wherein said locking means comprises an arcuate slot in said disc having at least one enlargement, said actuator having a small diameter portion disposable in said slot for permitting rotation of said disc and a large diameter portion disposable in said enlargement for preventing rotation of said disc, and second biasing means connected to said actuator for biasing said actuator in a direction to engage said large diameter portion in said enlargement.

4. A braking device according to claim 3, wherein said stopping means includes a journal plate fixed to said axle, said disc being rotatably mounted to said journal plate, said journal plate including an opening through which said actuator extends.

5. A braking device according to claim 4, when said disc includes a panel extending upwardly from a remainder of said disc and spaced from said actuator whereby said brake rod can be moved from its locking to its unlocking position by depressing said actuator downwardly and thereafter rotating said disc by engagement of said panel.

6. A braking device according to claim 4, wherein said first biasing means comprises a suspension spring connected between said suspension plate and the frame for resiliently mounting said axle on the frame.

7. A braking device according to claim 6, including a limiting plate pivotally connected to said suspension plate and to the frame, a post connected to one of the frame and said suspension plate, said limiting plate including an elongated slot therein for receiving said post and limiting the extent to which said suspension spring can be stretched.

8. A double action braking device for a perambulator having a frame with a pair of rear legs and a pair of rear wheels rotatably mounted to the frame, each wheel having a plurality of recesses therein, comprising:
an axle having opposite ends to which each rear wheel is rotatably mounted, said axle connected to the rear legs;
a journal plate connected to said axle;
a disc rotatably mounted to said journal plate having an arcuate slot with at least one enlargement therein;
a pair of brake rods pivotally mounted at mutually opposite eccentric locations on said disc and movable with rotation of said disc between locking positions extending into at least one recess of each rear wheel respectively and unlocking positions;
guide means connected to said frame for guiding an end of each brake rod for movement between an unlocking and locking position thereof;
an actuator having a small diameter portion movably mounted in an aperture of said journal plate, a large diameter portion having a diameter larger than said aperture of said journal plate and a head portion, said small diameter portion disposable in said disc slot for rotation of said disc and said large diameter portion disposable in said enlargement of said slot to prevent rotation of said disc, said enlargement positioned on said slot for engagement with said large diameter portion with said brake rods in their respective locking positions;
biasing means engaged between said actuator and said journal plate for biasing said actuator into a position with said large diameter portion in said slot enlargement; and
a panel connected to said disc for facilitating rotation of said disc.

9. A double action braking device according to claim 8, including a pair of suspension plates fixed to said axle and rotatably mounted to each rear leg respectively, each suspension plate having an opening therein for receiving each brake rod respectively to form said guide means; and
further biasing means connected between each suspension plate and each rear leg for resiliently suspending said axle.

10. A double action braking device according to claim 9, wherein said further biasing means comprises a limiting plate pivotally mounted to each suspension plate, a post connected to each rear leg, each limiting plate having an elongated slot therein for receiving each post respectively and limiting a pivotal rotation of each suspension plate, and a biasing spring connected between each suspension plate and each rear leg respectively.

11. A double action braking device according to claim 10, wherein said actuator includes a button on the top thereof for engagement by a user's foot which can also engage said panel from at least one side of said panel for sequential depression of said actuator and sidewards movement of said panel.

12. A double action braking device according to claim 11, wherein said panel and said button both include friction coverings.

13. A double action braking device according to claim 10, wherein said arcuate slot of said disc includes at least one additional enlargement, said first mentioned an additional enlargement disposed on opposite sides of said arcuate slot for receiving said large diameter portion of said actuator in respective locking and unlocking positions of said rods.

14. A double action braking device according to claim 10, wherein said panel extends upwardly from said disc and is spaced away from said actuator, said disc being rotatably mounted to said journal plate at a pivot joint, said pivot joint disposed on said disc between said actuator and said panel so that with said brake rods in their respective locking positions, said brake rods can be moved into their respective unlocking positions by first depressing said actuator with a user's foot and then engaging the user's foot on a side of said panel for rotating said disc.

* * * * *